Sept. 3, 1940.   J. E. SMITH   2,213,722
ELECTRICAL HEATING UNIT
Filed Dec. 30, 1937
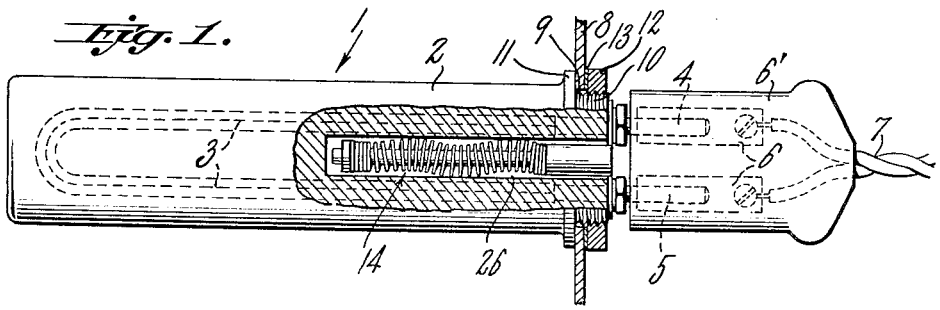
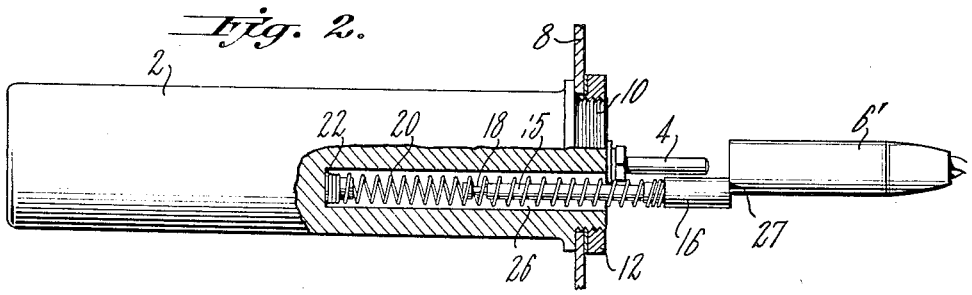
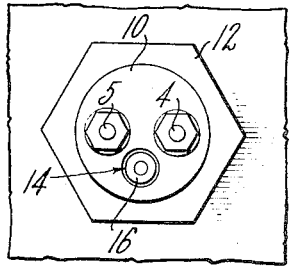
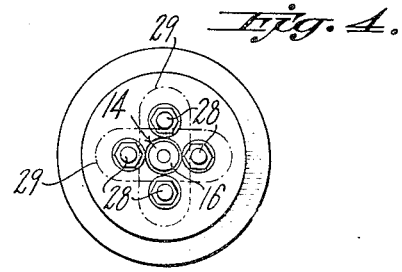
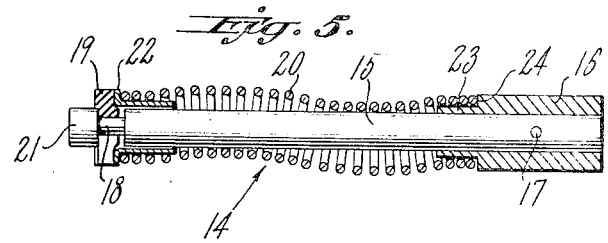
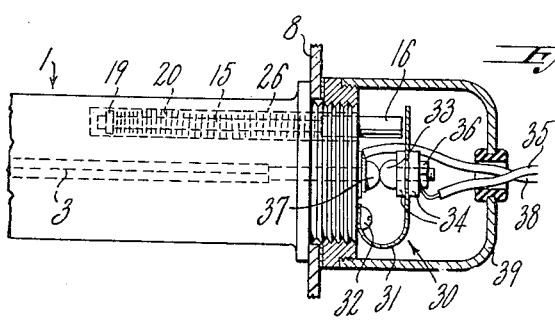
INVENTOR.
John E. Smith
BY
M. Theodore Simmons
ATTORNEY.

Patented Sept. 3, 1940

2,213,722

UNITED STATES PATENT OFFICE 2,213,722

ELECTRICAL HEATING UNIT

John E. Smith, Plainfield, N. J.

Application December 30, 1937, Serial No. 182,532

7 Claims. (Cl. 219—44)

This invention relates to heating devices, and particularly to electrical heating units such as those installed in coffee making apparatus, heating vessels, various types of boilers, and other similar heating equipment. More specifically the invention is concerned with means for disconnecting an electrical heating element from a source of current when the temperature of or surrounding the heating element rises above a predetermined degree.

The practice heretofore has been to provide a heating device of this character with a thermostatic switch contained within a housing or cover enclosing a heating element and serving to cut off the current in time to forestall injury to or destruction of the heating element and its associated parts. In many respects, this type of protection has not been satisfactory. Among other faults the thermostatic switches contained within the relatively small space provided in the interior of the heating unit were more or less delicate in construction, and not readily accessible for repairs or replacements. Furthermore, they required servicing by an expert mechanic, and dismantling of the heating equipment and the heating element itself before the parts could be reached for repair or renewal. Such work was costly, and kept the heating apparatus out of service during the time required to complete the repairs. In another type of heating unit a metallic casing was cast around the control mechanism, allowing no access thereto.

It is one of the objects of this invention to overcome the foregoing disadvantages by providing simple, inexpensive, and efficient means for disconnecting the heating element from the service current without resorting to inaccessible or difficult accessible control mechanism within the casing of the heating unit.

It is another object to provide a current breaking means which is quickly resettable from the outside of the heating equipment to reconnect the heating element to the service current, and requiring no dismantling of the heating equipment or the heating unit to give access to the circuit breaking means for repairs, adjustment or renewal.

Another object is to provide a fuse controlled device effective to disconnect the service current from the heating element when the temperature thereof reaches a predetermined degree.

Another object is to provide temperature controlled means for automatically removing a service plug from the terminals of a heating element.

Various other objects and advantages of the invention will be apparent as the description proceeds.

In the drawing forming a part of this specification:

Fig. 1 is a plan view of an installed heating unit embodying the invention, portions being broken away in section to show the interior and the parts in position to receive current from a service plug.

Fig. 2 is a side view of the Fig. 1 heating unit with portions broken away, and illustrating the mechanism in the act of removing or ejecting the service plug from the terminals of a heating element.

Fig. 3 is an end view of the two terminal heating units shown in Fig. 1.

Fig. 4 is a similar end view illustrating an application of the invention to a four terminal heating unit.

Fig. 5 is an enlarged sectional detail of the fuse controlled ejecting element shown in Figs. 1 and 2.

Fig. 6 is a face view of the fuse shown in section in Fig. 5.

Fig. 7 is a view partially broken away in section of a heating element provided with a special switching mechanism in combination with an ejector of the type shown in Fig. 5, and constituting a modified form of the invention.

In the drawing the reference character 1 indicates in general a heating unit comprising a body portion or casing 2 enclosing a suitably insulated heating element or coil 3 having terminal connections or posts 4 and 5 projecting from one end of the casing 2 for electrical connection with the terminal clips 6 of a service plug 6' provided with the usual conductors 7 from a source of electrical current. The heating unit 1 may be of the type having a heating element or coil encased in ceramic material, and a casing 2 comprising light weight metal molded to shape around the ceramic covering. However, the invention is not confined to this particular type of heating element, and is described here merely as an example.

The heating unit 1 is adapted to be installed as a permanent fixture in any heating container or other similar apparatus. For this purpose the wall 8 of a container is provided with an opening 9 through which a threaded end 10 of the unit 1 projects. The wall 8 is clamped between a shoulder 11 of the heating unit and a nut 12 backed by a washer 13.

If for any reason the temperature rises to a dangerous degree tending to injure or destroy the heating unit or the equipment with which it is associated, it is necessary that the heating current be cut off as quickly as possible. For accomplishing this purpose with speed and certainty there is provided a fuse controlled ejecting device 14 which may be of the construction shown in detail in Fig 5, and in its inactive position in Fig. 1. The ejecting device 14 as illustrated comprises a push rod 15 having a collar or enlarged portion 16 at one end fixed in place by a pin 17 or in any suitable other manner. The opposite end of the rod 15 is reduced at 18 to form a notch for the reception of a U-shaped fuse element 19 which straddles the reduced portion of the rod and is held under the pressure of an expansion spring 20 against a head 21 formed at the end of the rod. A flanged slidable collar 22 is interposed between one end of the spring 20 and the fuse element 19, the other end of the spring 20 being retained on an annular reduced portion 23 of the collar 16 forming a shoulder or backing 24 against which the other end of the compressed spring bears. The fuse element 19 may be cupped as indicated at 25 to engage partially over and around the notch edge of the head 21 to more securely retain the fuse in place.

The ejecting device 14 with its spring compressed is received in a pocket 26 of the heating unit 1 and normally occupies the position illustrated in Fig. 1 so that the service plug 6' can be connected to the terminals 4 and 5 of the heating element 3. It will be seen in Fig. 2 that the bore of the pocket 26 is in parallelism with the terminal posts 4 and 5, and locates the push rod 15 of the ejecting device beneath the overhanging edge 27 of the service plug 6'. The ejecting device 14 is self retained within the pocket 26 by reason of the wavy contour of the expansion spring 20 which engages the wall of the pocket at several points along its length.

The fuse element 19 is of a composition which will collapse or melt when the heating element has reached a definite temperature. For example, it may be of a composition to collapse or melt at a temperature of 350° F. When that temperature is attained the fuse 19 breaks down and thereby releases the tension of the expansion spring 20 which thereupon engages the bottom of the pocket 26 and projects the push rod 15 outwardly from the pocket, causing the enlarged end 16 to engage and move the service plug clear and free from the terminal posts 4 and 5.

The heating unit can be quickly restored to service by the simple expedient of withdrawing the ejecting device 14 from the pocket 26, fixing in place a new fuse element 19, and returning and returning the compressed unit to its place. Thus the parts are accessible from the outside of the heating equipment, and are rugged in construction and efficient in operation.

Fig. 4 is an end view illustrating the application of the invention to a four terminal heating unit. In this form of construction the ejecting device 14 is located centrally of the two pairs of terminal posts 28, so that it will be in position to push a service plug represented by the dot-and-dash lines 29 free of either of the pairs of terminal posts to which it is connected.

In the modification shown in Fig. 7 the heating unit 1 may be secured to the wall 8 of a heating vessel as in Fig. 1, and the circuit is adapted to be opened and closed by a switch 30 controlled by an ejecting device of the type shown and described in connection with Fig. 5. In this example of the invention the switch 30 comprises a spring 31 secured at 32 to the end of the heating unit 1. A contact 33 is carried by the spring 31 and is insulated therefrom by suitable insulating material 34. A conductor 35 is secured to the contact 33 by a nut 36. One end of the heating element or coil 3 is connected to a contact 37 adapted to cooperate with the contact 33 to close or open the circuit between the element and the service conductor 35. The other end of the heating element 3 is connected to a conductor 38 constituting the other side of the supply line. Normally the spring 31 closes the circuit through the contacts 33 and 37. When a dangerous temperature rise causes collapse of the fuse 19, the push rod 15 moves the free end of the spring 31 outward and thereby opens the circuit by separating the contacts 33 and 37. The device is readily re-set by removing the cover 39 and renewing the fuse 19.

Various alterations and modifications may be made in the construction and arrangement of the parts without departing from the invention, and it is therefore not intended to limit the application of the principles set forth, except as defined by the appended claims.

I claim:

1. An electrical heating unit comprising a casing provided with means for mounting the same on the wall of a heating vessel and adapted to extend through an opening in said wall to the interior of the vessel, an electrical heating element within said casing and provided with terminals accessible from the outside of the vessel, said terminals being arranged to engage the terminals of a detachable service plug, said casing having a pocket therein, an ejecting device comprising a push rod located in said pocket, an expansion spring therearound, and a fuse element carried by the push rod at one end of the spring, the opposite end of said push rod being provided with means arranged to hold the other end of the spring, said spring being normally compressed between said fuse and said holding means, and the push rod being positioned to engage and remove said service plug from the terminals of said heating element by projection of the push rod outwardly from said pocket under the action of the spring upon a collapse of said fuse.

2. An electrical heating unit comprising a casing provided with means for mounting on the wall of a heating vessel and adapted to extend through an opening in said wall to the interior of the vessel, an electrical heating element within said casing and provided with terminals at the outside of the vessel, said terminals being arranged to engage the terminals of a service plug, said casing having a pocket therein, an ejecting device in said pocket comprising a push rod, an expansion spring therearound, said push rod having a notch adjacent its inner end, a fuse element held in said notch at one end of the spring, an enlarged portion at the opposite end of the push rod and forming a backing for the other end of the spring, said spring being normally compressed between said fuse and said enlarged portion and having a wavy contour so that portions of its convolutions engage with the wall of said pocket to retain the ejecting device therein, said push rod being positioned to drive its enlarged end against the service plug to remove it from the heating terminals under the expanding action of the spring resulting from release of the spring compression after collapse of the fuse.

3. An electrical heating device having a pocket therein, a fused controlled, spring propelled ejector occupying said pocket and arranged so that the spring engages with the pocket wall to retain the ejector as a unit in the pocket, and a circuit connector in circuit with the heating device and actuated by said ejector upon the collapse of the fuse thereof.

4. An electrical heating device having a pocket therein, a fuse controlled, spring propelled push rod occupying said pocket, the spring normally being compressed and having a wavy contour so as to engage with the pocket wall to retain the push rod and spring in the pocket, and a circuit connector in circuit with the heating device and actuated by said ejector upon the collapse of the fuse thereof.

5. A heating unit comprising a resistance element, a cast aluminum body in which the heating element is mounted, a pair of terminal pins to which the ends of said heating element are connected, the terminal pins being arranged to receive a disconnectible service plug, a pocket extending a substantial distance in said body, and a fuse controlled ejector unit arranged to be mounted in said pocket and to disconnect the service plug from said terminal pins, said ejector unit comprising a push rod, an expansion spring and a replaceable fuse assembled together and arranged so that the ejector unit may be re-assembled and re-inserted in the pocket as a unit whenever it is necessary to replace the fuse.

6. An electrical heating unit adapted to extend through an opening in the wall of a heating vessel and comprising a casing arranged for mounting on the wall of the heating vessel, an electrical heating element within said casing, terminals on said casing accessible from outside the vessel and connected to said heating element, said terminals being arranged to engage the terminals of a detachable service plug, a pocket in said casing, an ejecting device comprising a push rod located in said pocket and having a head, an expansion spring, a fuse element, the spring being normally compressed between said fuse and said head, the push rod being positioned to engage and remove said service plug from the terminals of said heating element by projection of the push rod outwardly from said pocket under the action of the spring upon a collapse of said fuse.

7. A heating unit comprising a casing arranged for mounting on the wall of a heating vessel, a resistance element as a part of said unit and located within said vessel, terminals on said casing accessible from outside the vessel and connected to said heating element, said terminals being arranged to engage the terminals of a detachable service plug, a pocket in said casing, an ejecting device comprising a push rod located in said pocket and having a head, a normally compressed spring, a thermally responsive element instrumental in holding said spring compressed and upon heating thereof to release said spring to cause the push rod to remove said service plug from the heating element terminals under the action of said spring.

JOHN E. SMITH.